United States Patent
Soli et al.

(10) Patent No.: US 11,402,495 B2
(45) Date of Patent: Aug. 2, 2022

(54) SAR-BASED MONITORING OF NON-VISIBLE OR NON-ALWAYS-VISIBLE OR PARTIALLY VISIBLE TARGETS AND ASSOCIATED MONITORING, CRITICAL SITUATION DETECTION AND EARLY WARNING SYSTEMS AND METHODS

(71) Applicant: Thales Alenia Space Italia S.p.A. Con Unico Socio, Rome (IT)

(72) Inventors: Luca Soli, Rome (IT); Diego Calabrese, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 456 days.

(21) Appl. No.: 16/465,433

(22) PCT Filed: Dec. 1, 2017

(86) PCT No.: PCT/IB2017/057579
§ 371 (c)(1),
(2) Date: May 30, 2019

(87) PCT Pub. No.: WO2018/100550
PCT Pub. Date: Jun. 7, 2018

(65) Prior Publication Data
US 2020/0003895 A1    Jan. 2, 2020

(30) Foreign Application Priority Data
Dec. 1, 2016 (EP) .................................. 16425110

(51) Int. Cl.
*G01S 13/90* (2006.01)
*G01S 13/75* (2006.01)
*H01Q 15/18* (2006.01)

(52) U.S. Cl.
CPC .......... *G01S 13/9027* (2019.05); *G01S 13/75* (2013.01); *G01S 13/9004* (2019.05); *H01Q 15/18* (2013.01)

(58) Field of Classification Search
CPC .............................. G01S 13/9004; G01S 13/75
(Continued)

(56) References Cited

U.S. PATENT DOCUMENTS

| | | | |
|---|---|---|---|
| 4,184,155 A | 1/1980 | Sivertson Jr. | |
| 2013/0011019 A1* | 1/2013 | Beth ...................... | G01C 15/00 382/107 |
| 2013/0093610 A1 | 4/2013 | Tamburini et al. | |

FOREIGN PATENT DOCUMENTS

WO    WO-2012021923 A1 *  2/2012  ............... G01S 7/04

OTHER PUBLICATIONS

Ferretti "Submillimeter Accuracy of InSAR Time Series: Experimental Validation", May 2007. (Year: 2007).*

(Continued)

*Primary Examiner* — Thomas M Hammond, III
*Assistant Examiner* — Helena H Seraydaryan
(74) *Attorney, Agent, or Firm* — McCarter & English, LLP

(57) ABSTRACT

The invention concerns a monitoring method that comprises coupling in an integral manner at least one electromagnetic mirror of passive type with a given target to be monitored and monitoring the given target; wherein monitoring the given target includes: acquiring, via one or more synthetic aperture radar(s) installed on board one or more satellites and/or one or more aerial platforms, SAR images of a given area of the earth's surface where the given target is located; and determining, via a processing unit, a movement of the electromagnetic mirror on the basis of the acquired SAR images.

8 Claims, 10 Drawing Sheets

(58) Field of Classification Search
USPC .............................................................. 342/5
See application file for complete search history.

(56) References Cited

OTHER PUBLICATIONS

Alessandro Ferretti, et al. "Submillimeter Accuracy of InSAR Time Series: Experimental Validation", IEEE Transactions on Geoscience and Remote Sensing, IEEE Service Center, NJ. May 1, 2007, vol. 45, No. 5, pp. 1142-1153. 12 pages.
PCT International Search Report and Written Opinion dated Mar. 7, 2018 for PCT/IB2017/057579 (15 pages).

* cited by examiner

SAR-BASED MONITORING OF NON-VISIBLE OR NON-ALWAYS-VISIBLE OR PARTIALLY VISIBLE TARGETS AND ASSOCIATED MONITORING, CRITICAL SITUATION DETECTION AND EARLY WARNING SYSTEMS AND METHODS

CROSS-REFERENCE TO RELATED APPLICATIONS

This application is a 35 U.S.C. § 371 National Stage filing of International Application No. PCT/IB2017/057579, filed on Dec. 1, 2017, which claims priority to European Patent Application 16425110.0, filed on Dec. 1, 2016.

TECHNICAL FIELD OF INVENTION

The present invention concerns, in general, the monitoring of targets via synthetic aperture radar (SAR).

More specifically, the present invention relates to systems and methods for:
- monitoring targets (in particular, non-visible or non-always-visible or partially visible targets) via SAR;
- detecting critical situations affecting the monitored targets; and
- providing early warning in the event of a critical situation.

The present invention can be advantageously (even if not exclusively) exploited for monitoring infrastructures (for example, power lines, bridges, dams, viaducts, oil pipelines, gas pipelines, aqueducts, etc.), buildings, reservoirs, canals, rivers, lakes, etc.

STATE OF THE ART

As is known, one of the most widespread applications in the field of SAR systems is the monitoring of targets of interest.

To this end, interferometric techniques (for example, differential interferometry techniques) are used, that enable detecting and measuring movements of targets even significantly below the resolution of the SAR systems employed.

One of the main limitations of the interferometric techniques is tied to the capability of a SAR system to "see" a generic target of interest within the acquired SAR images, as well as the fact that these techniques require a long history of SAR acquisitions with similar geometry, thus needing a long period of time (typically months) to obtain the measurements.

As is known, the visibility of a generic target in a SAR image/acquisition depends on many factors, such as:
- the shape and size of the target, as well as the intrinsic characteristics of the material it is made of;
- the geometry and characteristics of the SAR acquisition;
- the geometry and characteristics of the imaged scene; and
- the characteristics of the SAR system employed.

In particular, depending on the aforementioned factors, a generic target might be:
- non-visible; or
- non-always-visible (for example, the presence of strong clutter could greatly limit the visibility of targets); or
- partially visible (for example, in the case where the quality of the signal backscattered by the target is not optimal).

In this respect, the following could be mentioned:
- targets having sizes significantly smaller than the resolution of the SAR images (e.g., overhead power lines), or the geometry of which is such that the backscattered energy is practically null (e.g., a metal sheet in a non-reflective position, as in the case of power line pylons); or
- cases where geometry of acquisition (or of the imaged scene) is such that it is difficult to isolate a target with well-characterized and time-stable geometries, and thus be able to analyse changes (e.g., stretches of water).

The use of special markers or electromagnetic mirrors (i.e. objects intrinsically and purely passive that do not require a power supply, nor any electrical system) to increase the radar cross-section of targets so as to increase visibility to radars is currently a known technique that is used exclusively for sighting radars (i.e. not for imaging radars, and certainly not for SAR systems).

With regard to this, reference can be made, for example, to U.S. Pat. No. 4,148,033 A (hereinafter indicated as Ref1 for simplicity), which describes a solution for increasing the visibility of objects for sighting radars. In particular, Ref1 describes the use of radar reflectors, or passive electromagnetic mirrors, designed to increase the backscattered signal, typically in a horizontal direction and at different angles, with the object of increasing the visibility of buoys, small boats and other floating objects, so as to reduce the probability of collision at sea.

The use of special markers or electromagnetic mirrors has also been proposed in the SAR field for the purposes of calibration of SAR sensors and/or characteristics of the imaged scene. In particular, in the SAR field, electromagnetic mirrors are typically used to have known targets (in terms of position and electromagnetic energy backscattering capacity), and therefore to be able to calibrate SAR remote sensing systems.

In addition, there are examples in the literature of using markers in the SAR field formed by active devices for the purposes of target identification or SAR system calibration.

Examples of active devices and passive electromagnetic mirrors used in the SAR field are provided in:
- U.S. Pat. No. 8,405,539 B2 (hereinafter indicated as Ref2 for simplicity), which describes the use of active transponders for the purposes of locating and identifying targets via SAR systems;
- US 2013/0093610 A1 (hereinafter indicated as Ref3 for simplicity), which describes the use of SAR systems and passive electromagnetic mirrors having a specific shape in order to measure earth surface movements (expediently, also through the auxiliary use of GPS sensors); in particular, the solution according to Ref3 requires the use of interferometric acquisitions and is used to perform area calibration; and
- U.S. Pat. No. 4,184,155 A (hereinafter indicated as Ref4 for simplicity), which describes a passive system for monitoring water levels; in particular, Ref4 describes the use of a passive radar target located in a specific position on the earth's surface (expediently, at a water basin) and designed to collect water and to vary its radar cross-section depending on the height of the water level of the water collected inside it, as well as the use of a SAR to monitor this radar target, and therefore the level of the water in the water basin where said radar target is installed.

The use of active devices, as in the case of the solution according to Ref2, necessarily requires supplying power to said devices (for example, by connecting to an electricity network or to systems/devices for generating electricity (e.g., photovoltaic panels), or via the use of electric batteries). Clearly, this imposes constraints on the maintenance and installation, and therefore on the use of these active devices.

OBJECT AND SUMMARY OF THE INVENTION

One general object of the present invention is to provide systems and methods for monitoring targets, detecting critical situations affecting the monitored targets and providing an early warning in the event of a critical situation, these systems and methods overcoming, at least in part, the limitations and/or technical drawbacks of, and/or being more reliable and/or efficient than, the current target monitoring, critical situation detection and early warning technologies.

In addition, a specific object of the present invention is to provide systems and methods that allow monitoring, via SAR, non-visible or non-always-visible or partially visible targets in a highly reliable and efficient manner, and that consequently also enable detecting, in a similarly reliable and efficient manner, critical situations affecting the monitored targets and providing an early warning in the event of a critical situation being detected.

These and other objects are achieved by the present invention in so far as it relates to a monitoring method and a monitoring, critical situation detection and early warning method, as defined in the appended claims.

In particular, the present invention relates to a monitoring method that comprises:
  integrally coupling at least one electromagnetic mirror of passive type with a given target to be monitored; and
  monitoring the given target.

In detail, monitoring the given target includes:
  acquiring, via one or more SARs installed on board one or more satellites and/or one or more aerial platforms, SAR images of a given area of the earth's surface where the given target is located; and
  determining, via a processing unit, a movement of the electromagnetic mirror on the basis of the acquired SAR images.

Preferably, integrally coupling at least one electromagnetic mirror of passive type with a given target to be monitored includes:
  integrally coupling a first electromagnetic mirror of passive type with the given target; and
  integrally coupling also a second electromagnetic mirror of passive type with the given target, or installing a second electromagnetic mirror of passive type in a given fixed position in the given area of the earth's surface where the given target is located.

In this case, monitoring the given target also includes calculating, via the processing unit, distances between the first electromagnetic mirror and the second electromagnetic mirror in the acquired SAR images.

Furthermore, determining a movement includes determining, via the processing unit, a movement of the first electromagnetic mirror with respect to the second electromagnetic mirror on the basis of the distances between said first electromagnetic mirror and said second electromagnetic mirror in the acquired SAR images.

The present invention also relates to a monitoring, critical situation detection and early warning method, which comprises:
  performing the aforementioned monitoring method;
  detecting, via the processing unit, a critical situation affecting the monitored given target on the basis of the movement of the electromagnetic mirror, or of the first electromagnetic mirror with respect to the second electromagnetic mirror, determined by said processing unit; and
  if a critical situation affecting the monitored given target is detected, generating, via the processing unit, an early warning.

Preferably, detecting, via the processing unit, a critical situation affecting the monitored given target includes:
  comparing the movement of the electromagnetic mirror, or of the first electromagnetic mirror with respect to the second electromagnetic mirror, with a predefined threshold; and
  detecting a critical situation affecting the monitored given target if the movement of the electromagnetic mirror, or of the first electromagnetic mirror with respect to the second electromagnetic mirror, exceeds the predefined threshold.

BRIEF DESCRIPTION OF DRAWINGS

For a better understanding of the present invention, some preferred embodiments, provided by way of non-limitative example, will now be described with reference to the accompanying drawings (not to scale), in which.

DETAILED DESCRIPTION OF PREFERRED EMBODIMENTS OF THE INVENTION

Figure 1:
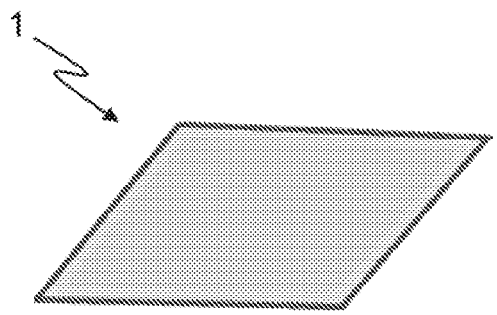
FIGS. 1-6 shows examples of electromagnetic mirrors usable by the present invention.

The following description is provided to enable an expert in the field to embody and use the invention. Various modifications to the embodiments shown will be immediately obvious to experts, and the generic principles described herein could be applied to other embodiments and applications without departing from the scope of protection of the present invention, as defined in the appended claims.

Thus, the present invention should not be intended as limited to just the embodiments set forth herein, but is to be accorded the widest scope consistent with the principles and features disclosed herein and defined in the appended claims.

First of all, it is important to draw attention to the fact that, within the scope of this patent application and therefore the present invention, the expressions "acquire a SAR image", "acquisition of a SAR image", "SAR acquisition" and equivalent related expressions mean the entire formation process of a SAR image that, as is known, comprises:
  transmitting, via a SAR transported in orbit/flight by a space/aerial platform (e.g. a satellite, a plane, a helicopter, a drone, or rather an unmanned aerial vehicle (UAV), etc.), radar signals so as to illuminate an area of the earth's surface with said radar signals;

receiving, via said SAR, the radar signals backscattered from said area of the earth's surface; and processing, via a processing unit integrated in the SAR or connected (even remotely) to the SAR, the received radar signals so as to form, or rather generate, a SAR image of said area of the earth's surface on the basis of the received and processed radar signals.

The present invention derives from the applicant's innovative idea of using the technology of purely passive electromagnetic mirrors (for example, the so-called "corner reflectors") to improve the visibility of a target and thus enable monitoring by means of one or more SAR remote sensing systems, especially in the case where the target is (for example, due to its physical or geometric shape) non-visible or non-always-visible or partially visible.

In other words, the applicant's idea is to couple passive electromagnetic mirrors with targets of interest, in particular with targets that are usually non-visible or non-always-visible or partially visible (such as, for example, overhead power line lines and pylons, buildings, bridges, viaducts, generic infrastructures, reservoirs, channels, rivers, lakes, etc.), so as render these targets clearly visible to SAR remote sensing systems, and thus make their monitoring possible by means of said remote sensing systems.

As previously explained, nowadays it is known to use passive electromagnetic mirrors to calibrate SAR systems. The present invention exploits the capability of these objects to appear as "ideal points", sufficiently "bright" with respect to the background or clutter in order to estimate their position with precision, in particular with an accuracy well below the resolution cell of the SAR system(s) used (for example, typical values are a twentieth of cell).

Therefore, by integrally coupling a passive electromagnetic mirror with a target of interest and acquiring SAR images of the area of the earth's surface where the target is located, it is possible to monitor said target; in particular, it is possible to detect and monitor any movements of the electromagnetic mirror, and therefore of the target. In this way, it is possible to also monitor non-visible or non-always-visible or partially visible targets.

Furthermore, according to a preferred embodiment of the present invention, two or more passive electromagnetic mirrors can be expediently used in a same scene in order to estimate the relative mutual distance(s) between said passive electromagnetic mirrors in a very accurate manner. In this way, it is possible to detect and monitor any changes in distance between the targets of interest that are integrally coupled with the electromagnetic mirrors. In particular, this characteristic (i.e. the use of relative distance measurements between electromagnetic mirrors, or rather between targets) enables exploiting not only interferometric techniques for monitoring, but also non-interferometric SAR acquisitions (i.e. not necessarily performed with the same geometry).

Therefore, in the light of that explained above, the present invention exploits two mature technologies, namely SAR technology and that of purely passive electromagnetic mirrors (nowadays used in the sighting radar field to increase the radar cross-section of targets, or in the SAR field for calibration purposes), in an innovative way for remotely monitoring non-visible or non-always-visible or partially visible objects, via both interferometric and non-interferometric measurements.

Different types of (completely passive) electromagnetic mirrors can be expediently used for the purposes of the present invention: from a simple inclined metal plane to a step-like or, more in general, dihedral-shaped structure, up to more complex geometries, such as electromagnetic mirrors having tetrahedral shapes (i.e. the so-called corner reflectors) or parabolic shapes. All of these electromagnetic mirrors have the property of concentrating the reflected energy in predetermined angular directions, in this way appearing like point targets.

Figure 2:
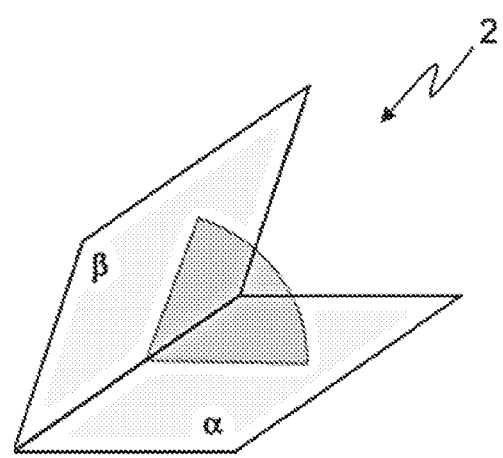
Figure 3:
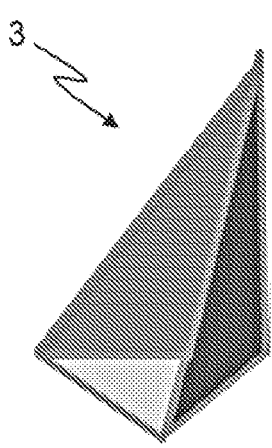
Figure 4:
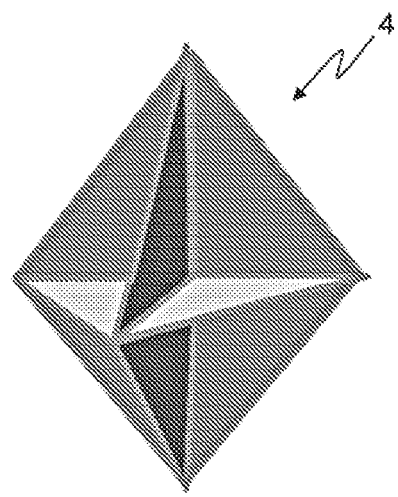
Figure 5:
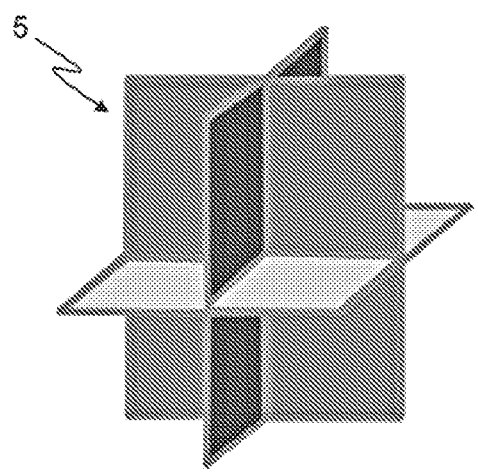
Figure 6:
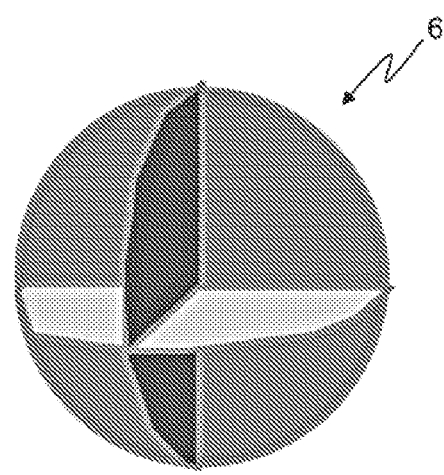

With regard to this, FIGS. 1-6 show, by way of non-limitative example, some examples of electromagnetic mirrors that can be used by the present invention. In particular, FIG. 1 shows a first electromagnetic mirror 1 made as an inclined metal plane, FIG. 2 shows a second electromagnetic mirror 2 with a dihedral shape, FIG. 3 shows a third electromagnetic mirror 3 with a tetrahedron-based shape, FIG. 4 shows a fourth electromagnetic mirror 4 with a multiple-tetrahedron-based shape, FIG. 5 shows a fifth electromagnetic mirror 5 with multiple flat faces and FIG. 6 shows a sixth electromagnetic mirror 6 with multiple flat faces on a spherical support.

In summary, the responses of these electromagnetic mirrors appear in a SAR image as luminous points that enable deriving, via interpolation procedures, the position of these electromagnetic mirrors more precisely with respect to the resolution of the SAR image.

With regard to this, FIGS. 7-14 conceptually illustrate the ability of estimating the position of an electromagnetic mirror in a SAR image with extreme accuracy.

Figure 7:
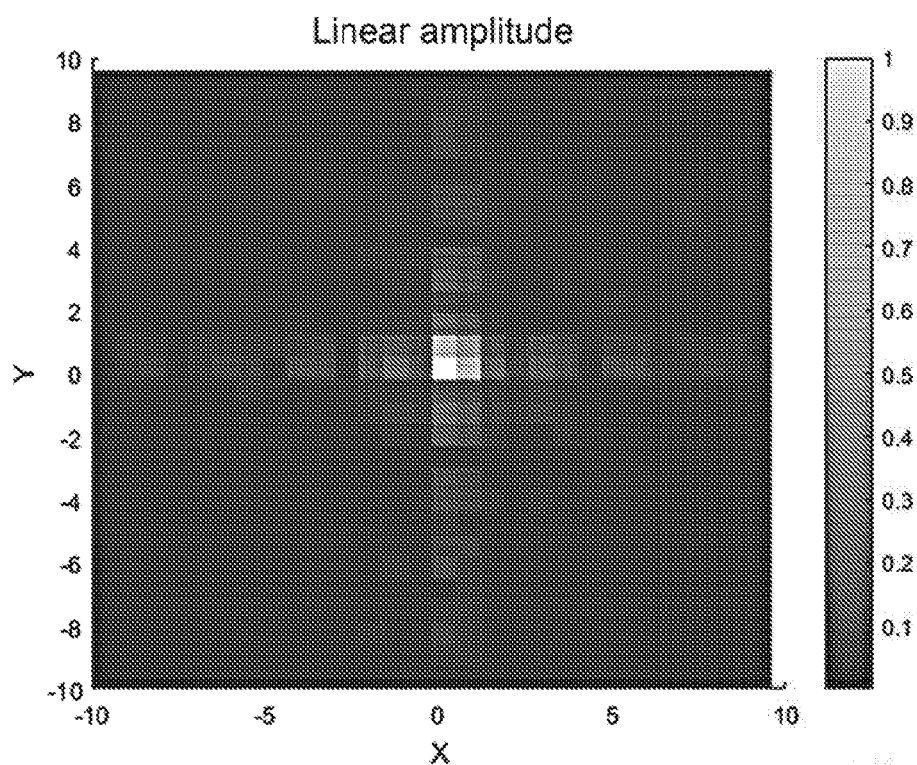
FIGS. 7-14 conceptually illustrate the possibility of estimating the position of an electromagnetic mirror in a SAR image with extreme accuracy.
Figure 8:
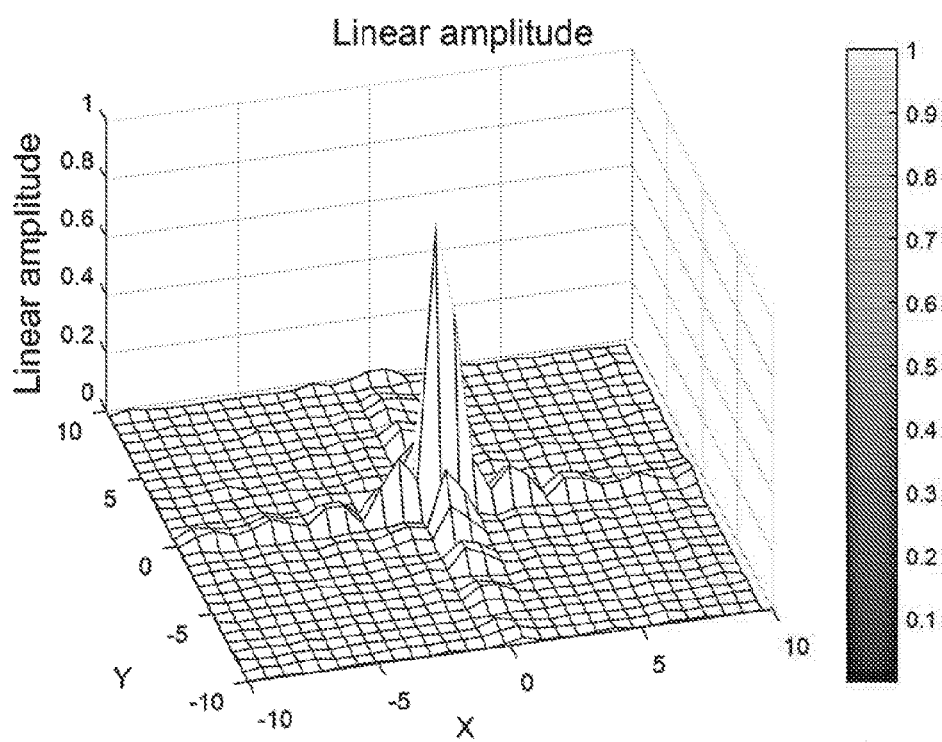
Figure 9:
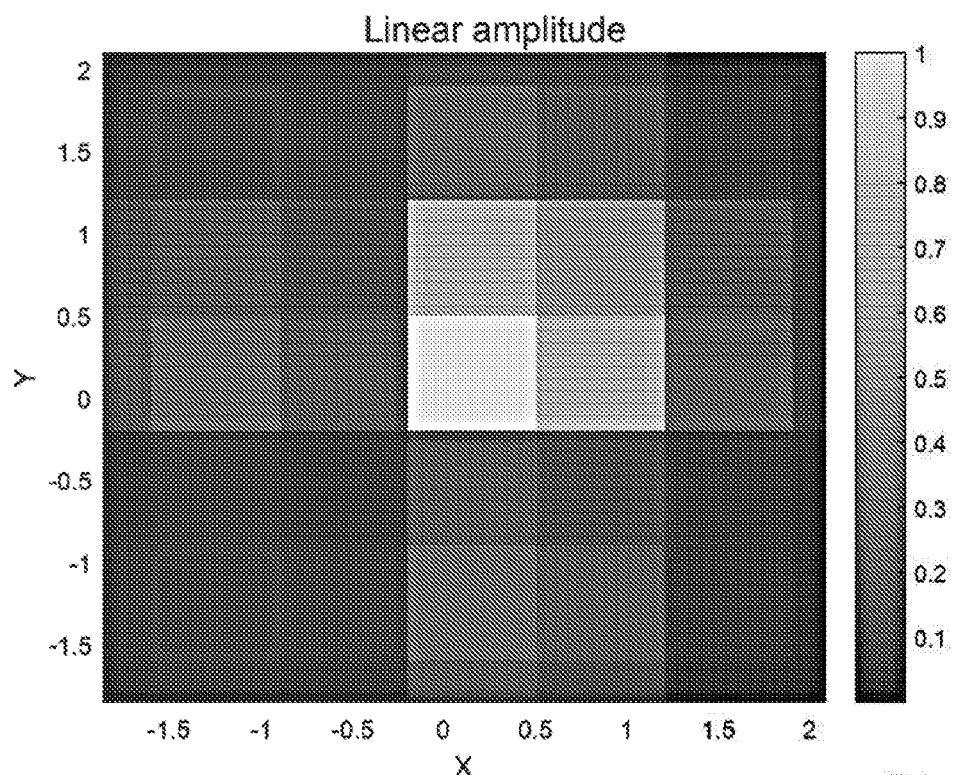
Figure 10:
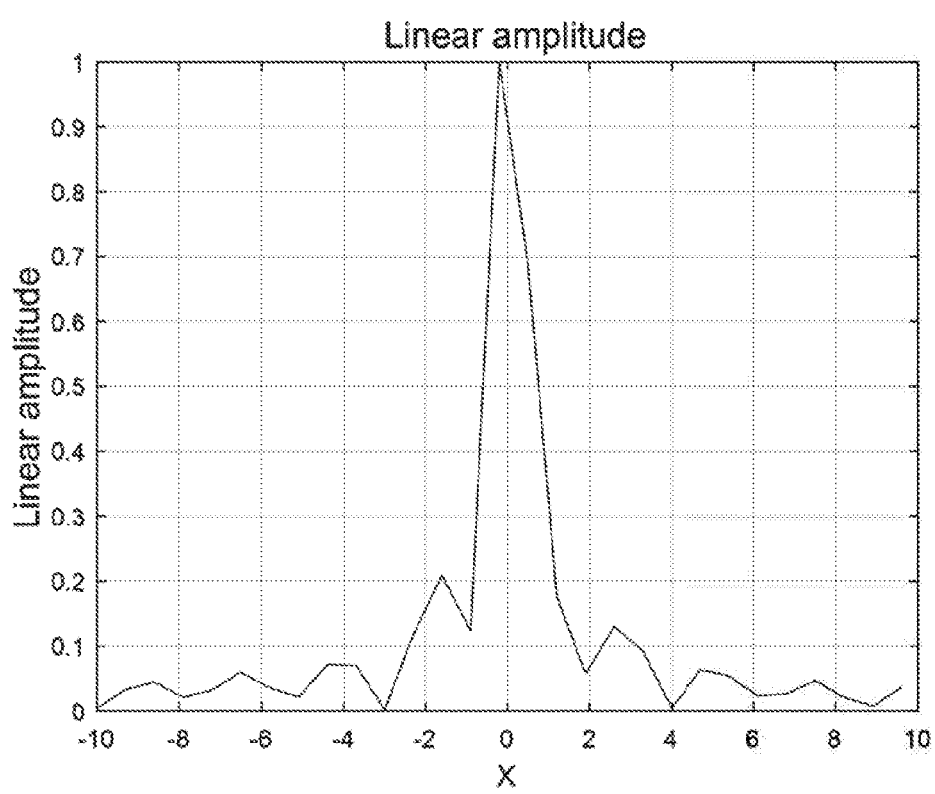

In particular, FIG. 7 shows a first SAR image example in which there are some pixels much brighter than the background, due to the presence of an electromagnetic mirror in the imaged scene; FIG. 8 shows a three-dimensional graph of the intensities of the pixels in the SAR image of FIG. 7; FIG. 9 shows an enlargement of the area of the SAR image in FIG. 7 in which the electromagnetic mirror is located; FIG. 10 shows a graph of the intensities of the pixels in the SAR image area shown in FIG. 9 along a single axis (i.e., axis X) of the image plane (i.e., plane XY).

Figure 11:
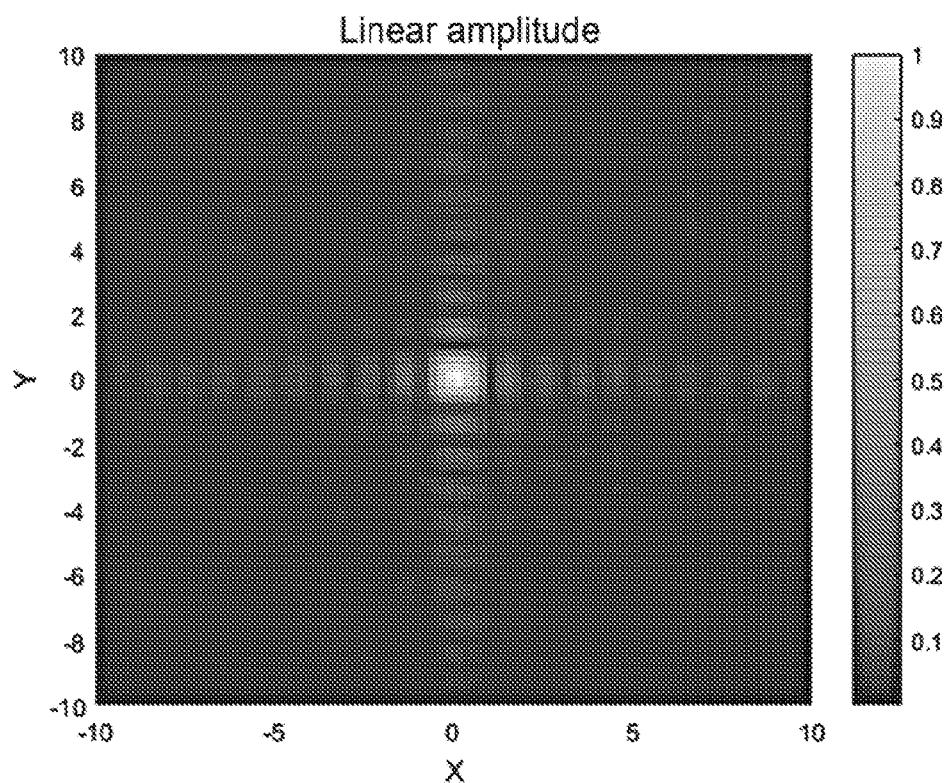
Figure 12:
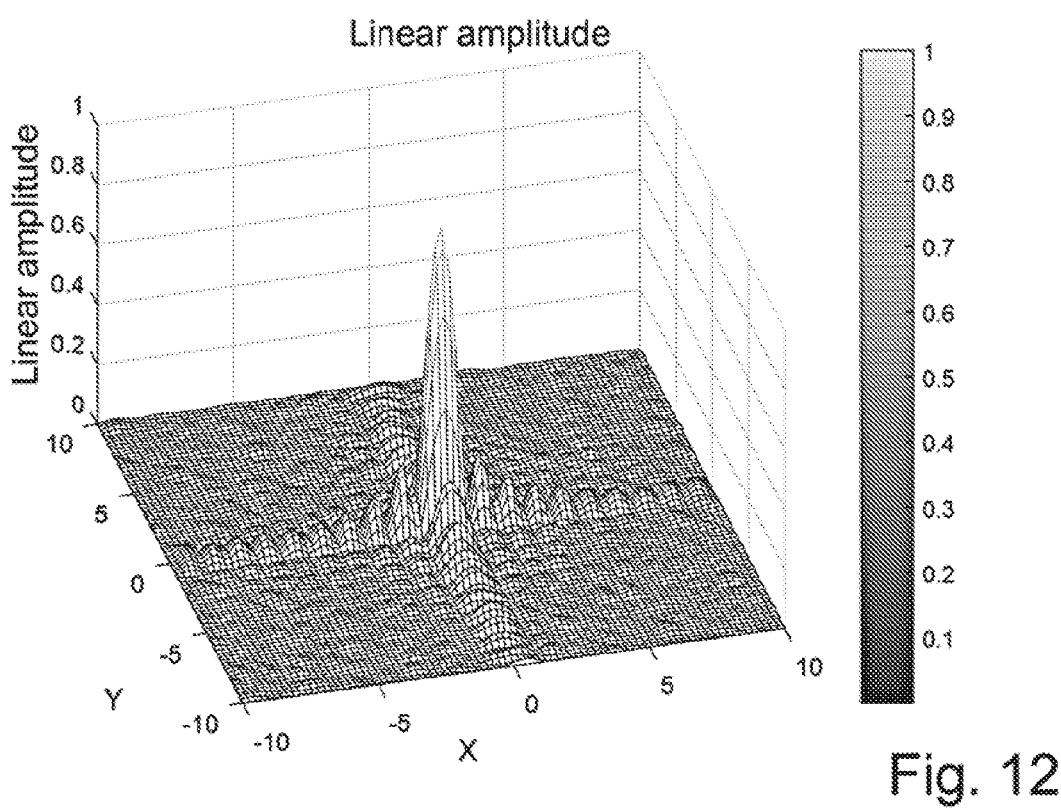
Figure 13:
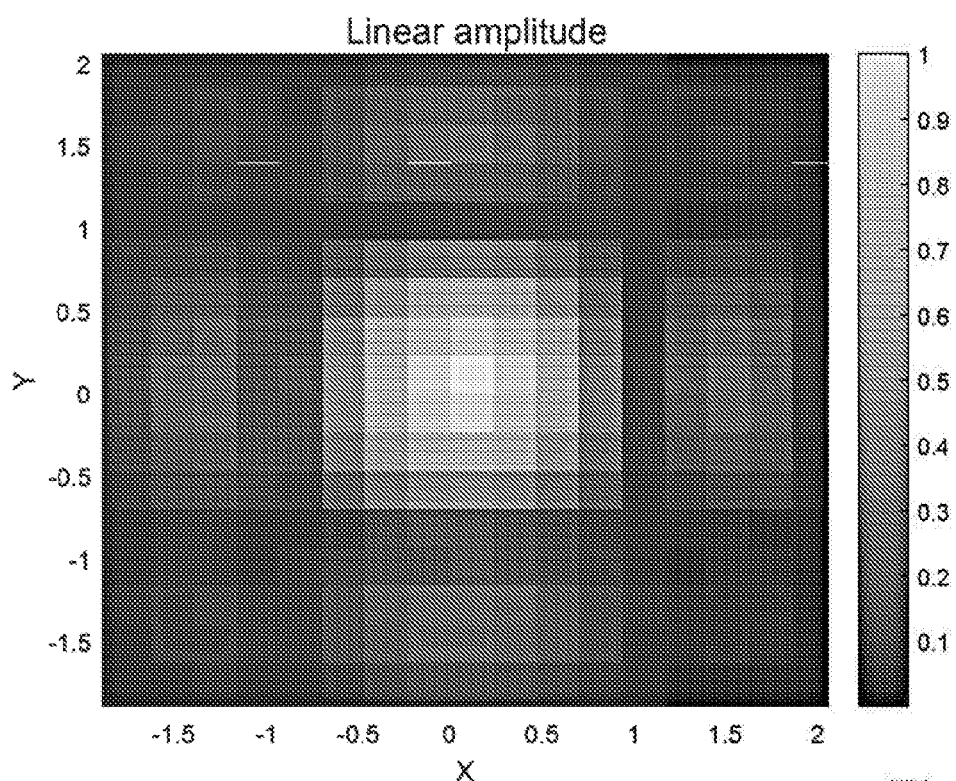
Figure 14:
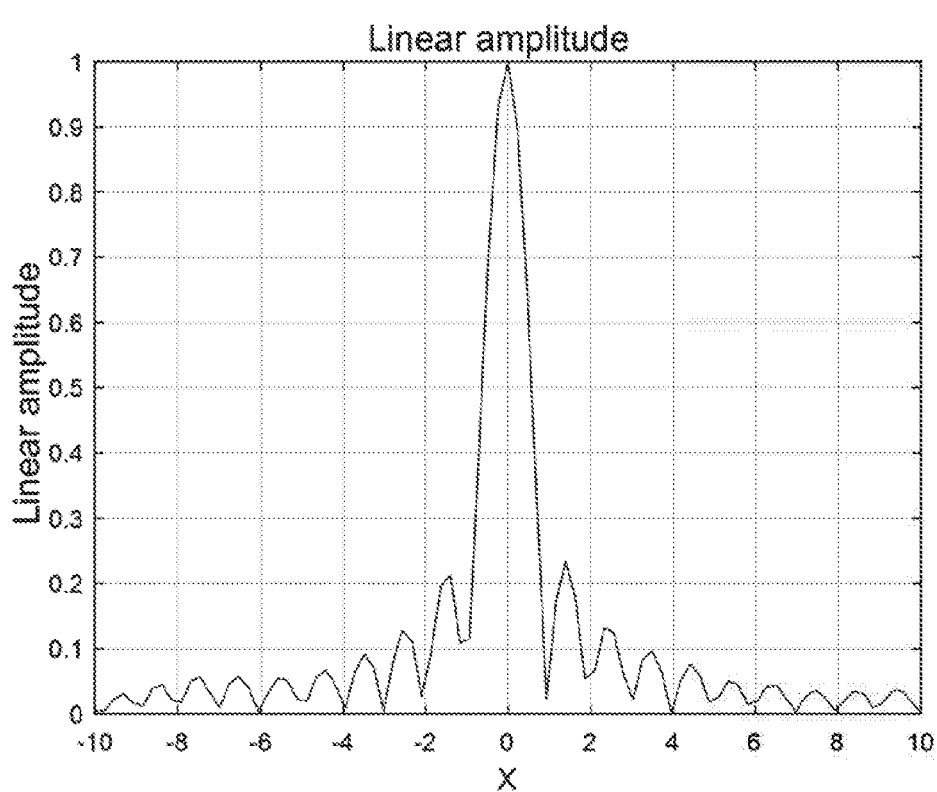

In addition, FIG. 11 shows a second SAR image example in which there are some pixels much brighter than the background, due to the presence of an electromagnetic mirror in the imaged scene; FIG. 12 shows a three-dimensional graph of the intensities of the pixels in the SAR image in FIG. 11; FIG. 13 shows an enlargement of the area of the SAR image in FIG. 11 in which the electromagnetic mirror is located; FIG. 14 shows a graph of the intensities of the pixels in the SAR image area shown in FIG. 13 along a single axis (i.e., axis X) of the image plane (i.e., plane XY).

The ability of the electromagnetic mirrors to concentrate energy in a few pixels (FIGS. 7, 9, 11 and 13) enables estimating much more accurately the position of the response peak, which coincides with the position of the electromagnetic mirror (FIGS. 8, 10, 12, 14).

Thanks to this ability, it is therefore possible estimate the relative distances between two electromagnetic mirrors in a very accurate manner regardless of the acquisition geometry; that is, unlike interferometric techniques, it is not necessary that the SAR acquisitions be made with the same shooting geometries. By being able to exploit all the acquisition geometries, it is possible to achieve highly improved monitoring time-wise for the same SAR observation system (e.g., considering the typical orbits of the satellites, days can become a few hours).

Furthermore, the signals backscattered from the various electromagnetic mirrors undergo the same delays due to the atmosphere; these delays are thus cancelled when estimating the relative distances.

Conveniently, by knowing the nominal position of the electromagnetic mirrors in advance, search and identification activities for the electromagnetic mirrors in the SAR images can be advantageously simplified.

Furthermore, as monitoring can also be performed on the basis of measurements of changes in the relative distances between electromagnetic mirrors (and therefore not necessarily with interferometric techniques), measurements obtained from SAR sensors operating at different frequencies (e.g., in the C, L and X bands) and/or with different resolutions and/or embarked on different craft (planes and/or satellites and/or drones, etc.) can also be used.

For a better understanding of the present invention, FIGS. 15-18 schematically show application examples of the present invention.

Figure 15:
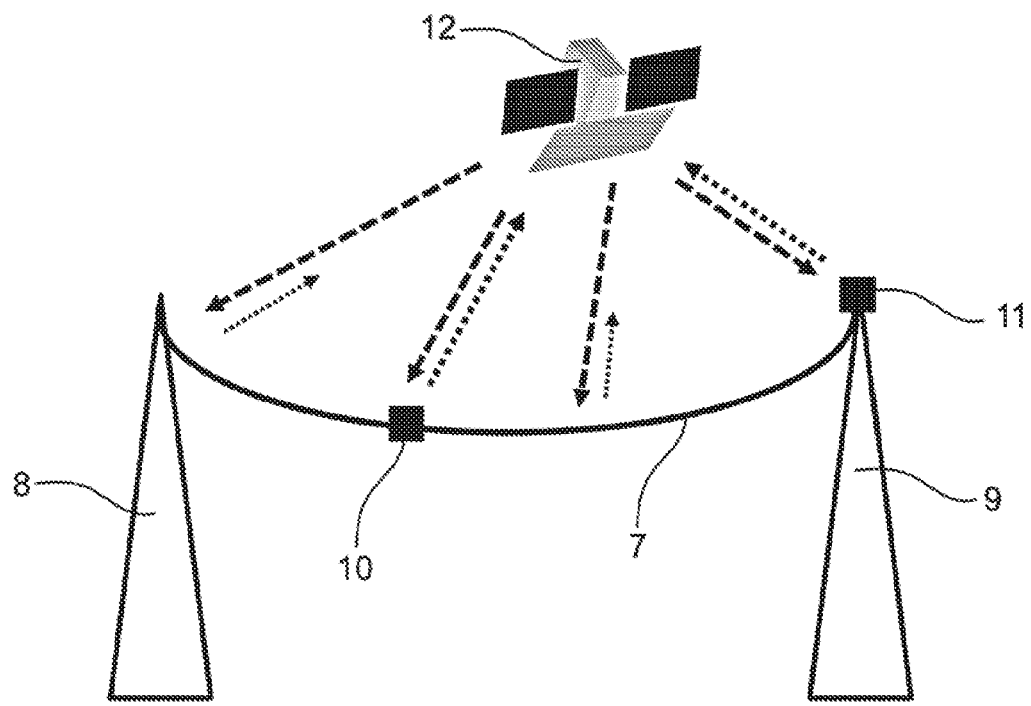
FIGS. 15-18 schematically show application examples of the present invention.

In particular, the example shown in FIG. 15 regards the monitoring of overhead power lines.

Without using the present invention, the identification of overhead power lines via SAR would depend on a vast number of conditions. For example, the orientation of the overhead lines with respect to the direction from which the SAR's radar beam arrives, where this orientation depends not only on the position of the SAR (for example, in the case of satellite SAR, the orbital position of the satellite on which said SAR is installed), but also on the local oscillations and rotations of the overhead lines due the effect, for example, of wind or temperature changes.

Instead, thanks to the present invention, or rather thanks to the coupling, of an integral nature, of at least one electromagnetic mirror with one of the overhead power lines, it is possible to identify and monitor said overhead lines at each orbital passage of a satellite SAR and/or at each overflight of an airborne SAR. In fact, on each passage/overflight of the satellite/airborne SAR, it is possible to acquire a respective SAR image in which the electromagnetic mirror coupled with the overhead line is assuredly and perfectly visible. Therefore, by processing the SAR images acquired through one or more predefined interferometric techniques (expediently, one or more predefined differential interferometry techniques), it is possible to detect possible movements of the electromagnetic mirror, i.e. of the respective overhead line coupled with said electromagnetic mirror. For example, it is possible to detect a lowering of the overhead line (due, for example, to the presence of snow or ice).

Furthermore, by also applying electromagnetic mirrors to reference points (e.g., power line pylons or nearby surfaces) as well as to the overhead lines, it is possible to monitor the relative distances between said overhead lines and said reference points, and therefore detect possible changes over time of these relative distances (caused, for example, by the lowering or raising of the overhead lines). Moreover, as previously explained, in order to determine and consequently monitor said relative distances, it is not necessary to use interferometric techniques, and it is therefore possible to use SAR images acquired with different geometries and/or SAR sensors having different characteristics (e.g., different resolutions) and/or installed on board different platforms (for example, a satellite SAR and a SAR transported in flight by a drone/plane) and/or operating at different frequencies (e.g., a SAR sensor operating in the C band, a SAR sensor operating in the L band and a SAR sensor operating in the X band).

With regard to this, reference can be made to FIG. 15, in which an overhead line 7 suspended between a first pylon 8 and a second pylon 9 is integrally coupled with a first electromagnetic mirror 10, while a second electromagnetic mirror 11 is integrally coupled with the second pylon 9.

In addition, for illustrative purposes, FIG. 15 also shows a satellite 12 equipped with a SAR sensor that performs SAR acquisitions of the area of the earth's surface where said overhead line 7 and said pylons 8 and 9 are located.

As previously explained, thanks to coupling with the first and second electromagnetic mirrors 10 and 11, the overhead line 7 and the second pylon 9 are clearly visible in the SAR images acquired by the SAR sensor on board the satellite 12. In this way, it is possible to monitor the relative distance between said overhead line 7 and said second pylon 9, and therefore detect possible changes in this distance over time. For example, it is possible to detect if the overhead line 7 drops with respect to the second pylon 9 (i.e. with respect to a nominal reference position) even if the dimensions of said overhead line 7 are much smaller than the resolution of the SAR sensor used.

Furthermore, in this way it is also possible to:

detect possible critical situations affecting the overhead line 7 (for example, by comparing the variations in relative distance between said overhead line 7 and said second pylon 9 with one or more predefined maximum tolerance thresholds); and automatically generate an early warning message if a critical situation is detected (for example, so that engineers can intervene to resolve the critical situation before the line 7 breaks or, more in general, so that countermeasures can be taken aimed at resolving the detected critical situation or to minimize the associated adverse effects).

Figure 16:
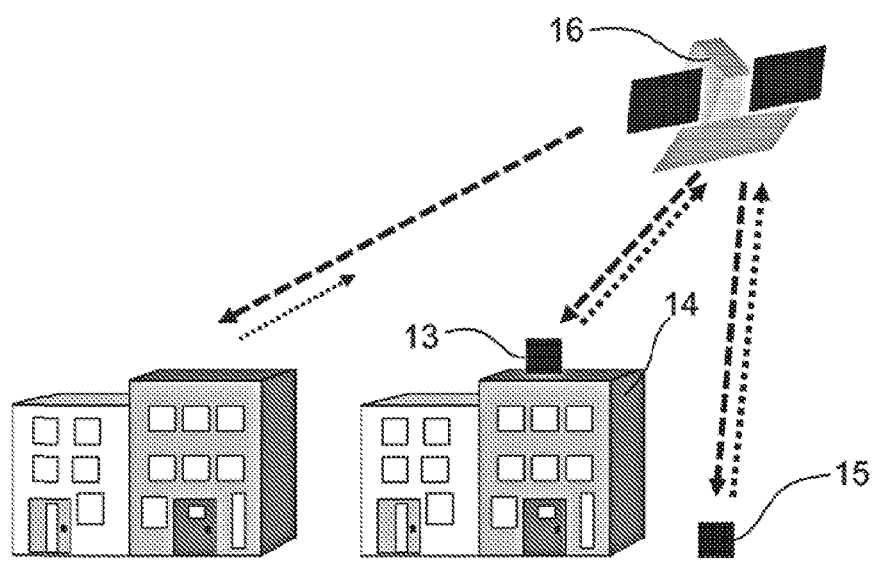

Instead, the example shown in FIG. 16 concerns building monitoring. In particular, as shown in FIG. 16, a first electromagnetic mirror 13 is installed on the roof of a building 14, while a second electromagnetic mirror 15 is installed, in a fixed manner, in the vicinity of said building 14.

In addition, for illustrative purposes, FIG. 16 also shows a satellite 16 equipped with a SAR sensor that performs SAR acquisitions of the area of the earth's surface where said building 14 (and therefore said first electromagnetic mirror 13) and said second electromagnetic mirror 15 are located.

In this way, despite the roof of a building generally being a target not very visible for a SAR, due to the use of the first electromagnetic mirror 13, the roof of the building 14 becomes extremely visible for the SAR sensor on board the satellite 16. Thus, in this way it is possible to monitor said building with extreme accuracy regardless of the sensitivity and resolution of the SAR sensor used. In particular, it is possible to detect and therefore monitor possible movements of the building 14 with respect to the reference position represented by the second electromagnetic mirror 15.

Furthermore, by installing two or more passive electromagnetic mirrors in different points of a same building it is possible to detect, measure and monitor any deformations of said building.

Thanks to the present invention, it is therefore possible to monitor buildings that are unsafe or sinking into the ground, detecting possible critical situations and automatically generating an early warning message in the event of a critical situation being detected, thereby enabling action to be taken to secure the area and safeguard the people present in the area.

Figure 17:
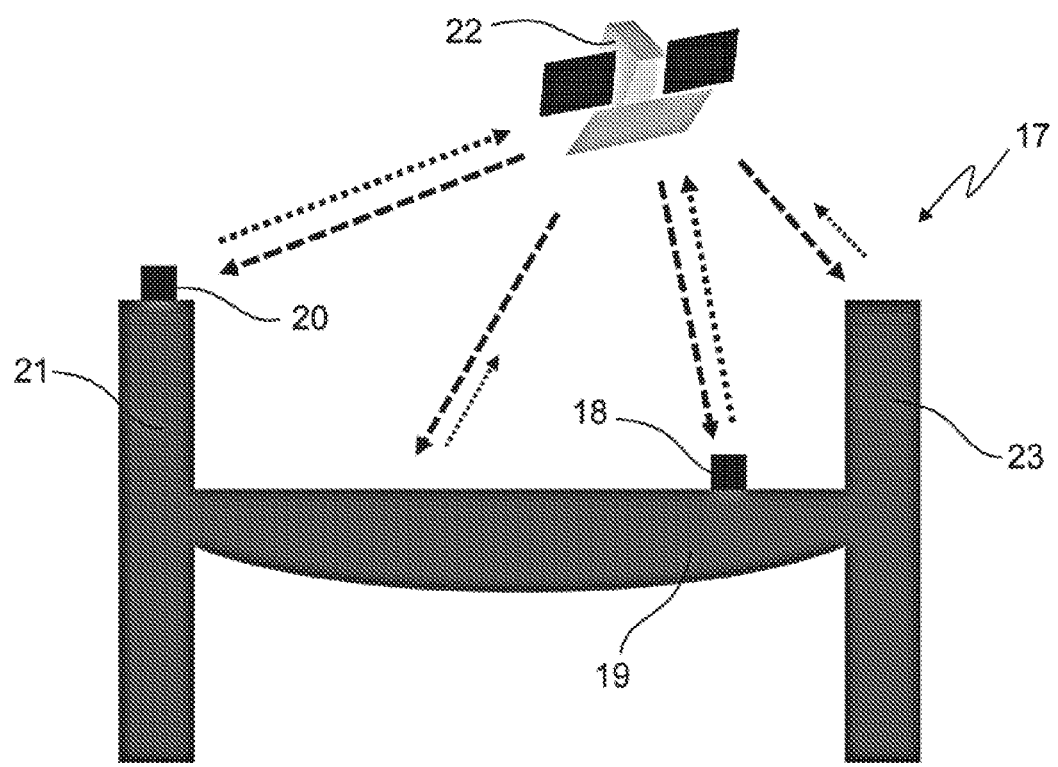

The same also applies to the example shown in FIG. 17, which regards the monitoring of a bridge 17. In particular, as shown in FIG. 17, a first electromagnetic mirror 18 is integrally coupled with the deck 19 of the bridge 17, while a second electromagnetic mirror 20 is integrally coupled with a pier 21 of the bridge 17.

In addition, for illustrative purposes, FIG. 17 also shows a satellite 22 equipped with a SAR sensor that performs SAR acquisitions of the area of the earth's surface where said bridge 17 is located.

In this way, it is therefore possible to monitor said bridge 17 independently of the sensitivity and resolution of the SAR sensor used. In particular, it is possible to monitor the distance between the first electromagnetic mirror 18 and the second electromagnetic mirror 20 (i.e. between the deck 19 and the pier 21) with extreme accuracy, detecting possible critical situations and automatically generating an early warning in the event of a critical situation being detected, so as to enable immediate action to be taken to secure the bridge 17.

It is important to stress the point that it is also possible to use additional electromagnetic mirrors in the examples shown in FIGS. 15 and 17.

For example, in the example in FIG. 15, a first further electromagnetic mirror could be expediently coupled in an integral manner with the first pylon 8 and a second further electromagnetic mirror could be expediently installed, in a fixed manner, in the vicinity of the overhead line 7 and the pylons 8 and 9, in order to monitor possible movements of the pylons 8 and 9 and/or the overhead line 7 with respect to the reference position represented by the second further electromagnetic mirror installed nearby.

Instead, with regard to the example in FIG. 17, a first further electromagnetic mirror could be expediently coupled in an integral manner with another pier (indicated by reference numeral 23) of the bridge 17 and a second further electromagnetic mirror could be expediently installed, in a fixed manner, in the vicinity of the bridge 17, in order to monitor possible movements of the deck 19 and/or the piers 21 and 23 with respect to the reference position represented by the second further electromagnetic mirror installed in the vicinity of the bridge 17.

In the light of what has so far been explained, it shall be immediately obvious to an expert in the field that the present invention can be advantageously exploited for monitoring various types of infrastructures, such as dams, viaducts, oil pipelines, gas pipelines, aqueducts, etc., as well as for detecting movements of the ground around buried infrastructures (e.g., oil pipelines, gas pipelines, etc.).

Figure 18:
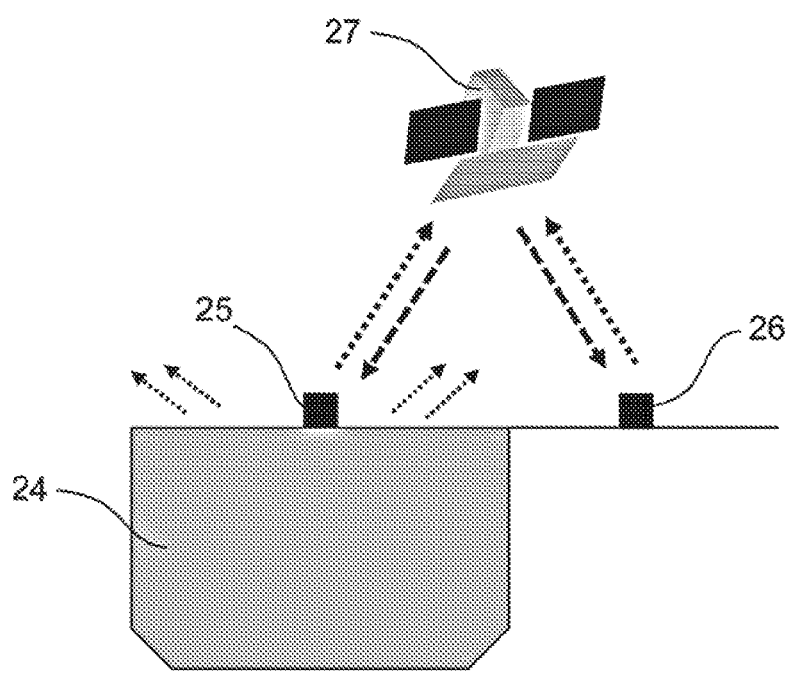

In addition, the example shown in FIG. 18 regards the monitoring of the level of water in a reservoir 24 (for example, a natural or artificial reservoir, a channel, a river, a lake, etc.). In particular, as shown in FIG. 18, a first electromagnetic mirror 25 is installed so as to be integral with the level of the water in the reservoir 24 (for example, a floating buoy configured to function as an electromagnetic mirror could be expediently used for this purpose). In addition, a second electromagnetic mirror 26 is installed, in a fixed manner, in the vicinity of the reservoir 24 (for example, it could be expediently installed on the bank of said reservoir 24).

For illustrative purposes, FIG. 18 also shows a satellite 27 equipped with a SAR sensor that performs SAR acquisitions of the area of the earth's surface where the reservoir 24 is located.

In this way, it is possible to estimate the trend of the water level over time by comparing the relative positions between the first electromagnetic mirror 25 that floats on the water and the second electromagnetic mirror 26 installed on the bank.

Figure 19:
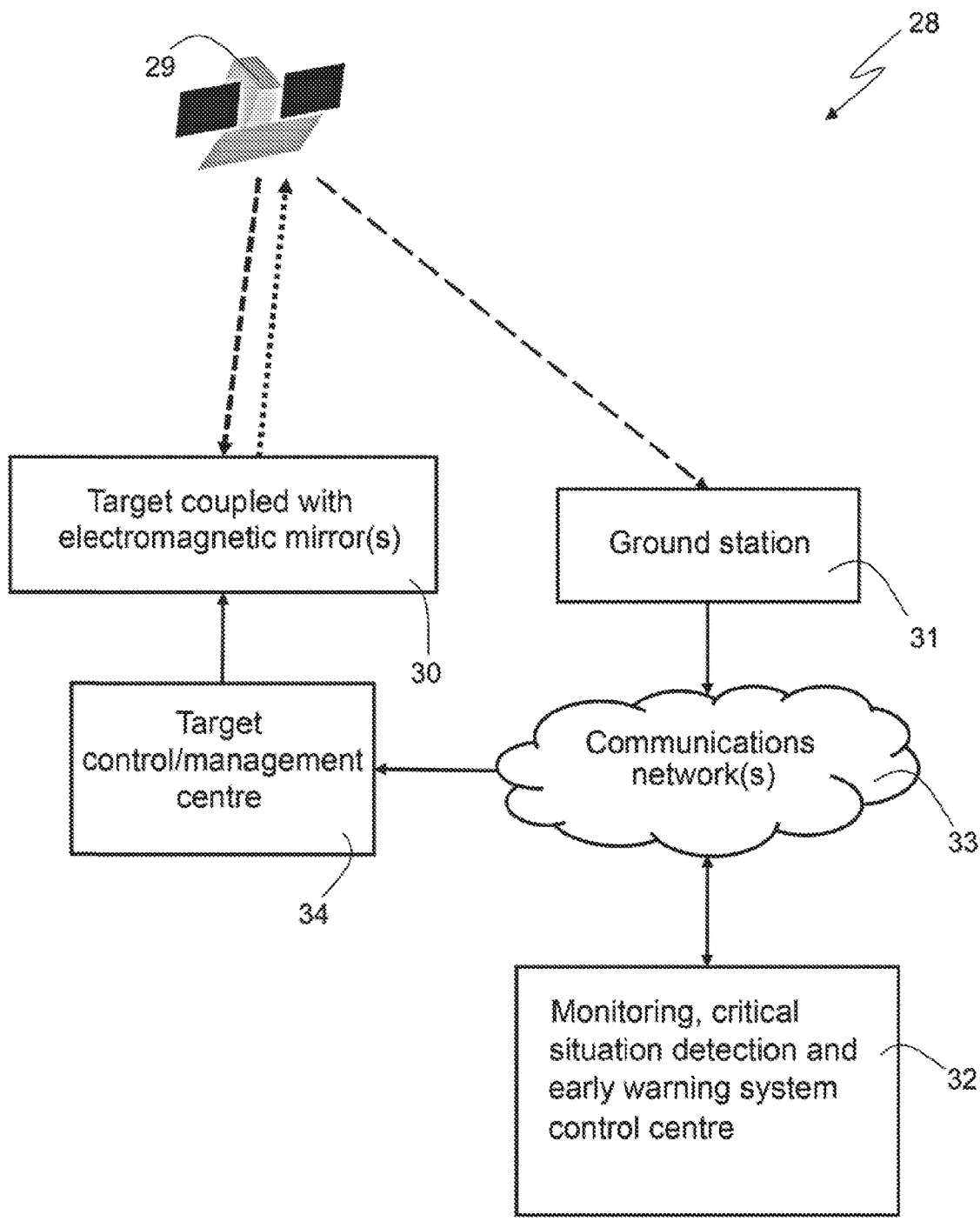
FIG. 19 schematically shows a monitoring, critical situation detection and early warning system according to a preferred (but non-limitative) embodiment of the present invention.

In addition, FIG. 19 schematically shows a monitoring, critical situation detection and early warning system (indicated as a whole by reference numeral 28) according to a preferred (but non-limitative) embodiment of the present invention.

In particular, in the monitoring, critical situation detection and early warning system 28, a SAR sensor installed on board a satellite 29 is used to acquire SAR images of an area of the earth's surface where a target 30 to be monitored is located that is coupled with one or more passive electromagnetic mirrors (for example, of the type shown in FIGS. 1-6, or even of a different type).

Opportunely, the target 30 can be a power line (in particular, one or more overhead lines and/or one or more pylons of said power line) as in the example in FIG. 15, a building as in the example in FIG. 16, a bridge as in the example in FIG. 17, a reservoir (for example, a natural or artificial reservoir, a channel, a river, a lake, etc.) as in the example in FIG. 18, or a generic infrastructure (for example, a dam, viaduct, oil pipeline, gas pipeline, aqueduct, etc.).

In use, the satellite 29 transmits the acquired SAR images directly (as shown in FIG. 19) and/or via a satellite communications system, i.e., via one or more communications satellites (not shown in FIG. 19 for simplicity of illustration), to a ground station 31 located on the earth's surface.

The monitoring, critical situation detection and early warning system 28 includes a control centre 32 that is connected to the ground station 31 by one or more communications networks 33, preferably one or more networks based on the Internet Protocol (IP), expediently the Internet network.

In particular, the control centre 32 of the monitoring, critical situation detection and early warning system 28 includes at least one processing unit configured to:
  receive the SAR images acquired by the SAR sensor on board the satellite 29 from the ground station 31, via the communications network(s) 33;
  process said SAR images using one or more predefined processing techniques (which, as previously explained, can be interferometric or other processing techniques) so as to determine any movements of the target 30;
  detect a possible critical situation affecting the target 30 on the basis of any movements of said target 30 determined by said processing unit; and
  if a critical situation is detected, send an early warning message over the communications network(s) 33 to a control and/or management centre 34 of the target 30 so that the relevant countermeasures can be taken.

Clearly, as previously explained, for the purposes of the present invention, a plurality of satellite SAR sensors that may even have mutually different characteristics (for example, different resolutions) and/or that may acquire SAR images of the target 30 with mutually different acquisition geometries can be expediently used.

Always as previously explained, for the purposes of the present invention, one or more SAR sensors that are transported in flight by aerial platforms (for example, planes, drones/UAVs, helicopters, etc.) and that may even have mutually different characteristics (for example, different resolutions) and/or that may acquire SAR images of the target 30 with mutually different acquisition geometries can be expediently used as an alternative or in addition to the satellite SAR sensor(s).

Figure 20:
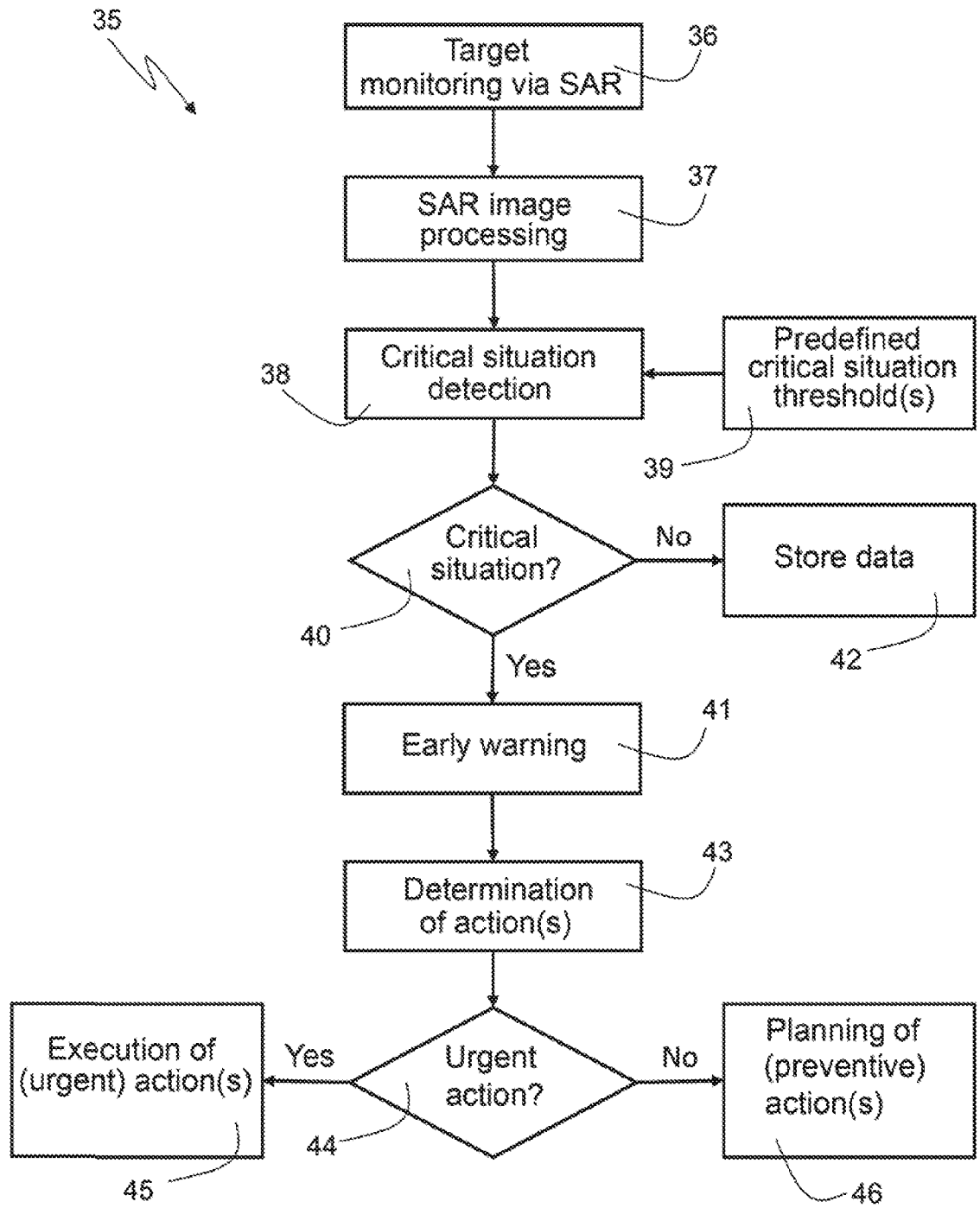
FIG. 20 schematically show a monitoring, critical situation detection and early warning method according to a preferred (but non-limitative) embodiment of the present invention.

Finally, FIG. 20 schematically shows a monitoring, critical situation detection and early warning method (indicated as a whole by reference numeral 35) according to a preferred (but non-limitative) embodiment of the present invention. In particular, said monitoring, critical situation detection and early warning system 28 shown in FIG. 19 is expediently configured to execute the monitoring, critical situation detection and early warning method 35 shown in FIG. 20.

In detail, said monitoring, critical situation detection and early warning method 35 includes performing the following operations via the control centre 32 of the monitoring, critical situation detection and early warning system 28 (in particular, via the processing unit of said control centre 32):

- monitoring one or more targets of interest (e.g., the target 30) coupled with passive electromagnetic mirrors (for example, of the type shown in FIGS. 1-6, or even of a different type) via one or more satellite SAR systems (e.g., the SAR sensor on board the satellite 29) and/or SAR systems transported by aerial platforms (e.g., planes, drones/UAVs, helicopters, etc.)—block 36 in FIG. 20;
- processing the SAR images acquired by the SAR system(s) using one or more predefined processing techniques (i.e. one or more predefined interferometric techniques (in particular, differential interferometry), or other techniques) so as to determine any movements of the targets—block 37 in FIG. 20;
- detecting a critical situation affecting a monitored target on the basis of a possible movement of said target detected/determined by the processing unit and one or more predefined critical situation thresholds (for example, stored in said processing unit)—blocks 38 and 39 in FIG. 20; and,
- if a critical situation is detected, generating an early warning (for example, by sending an early warning message to the control and/or management centre 34 of the target 30 for which said critical situation was detected); otherwise (i.e. if no critical situation is detected), store the data—blocks 40, 41 and 42 in FIG. 20.

In addition, if a critical situation is detected and an early warning is thus generated, the monitoring, critical situation detection and early warning method 35 also includes performing the following operations via the control and/or management centre 34 of the target 30 on which said critical situation was detected:

- determining one or more actions (countermeasures) to be performed to counter and/or eliminate and/or resolve the critical situation and/or to reduce/minimize/eliminate the associated adverse effects—block 43 in FIG. 20;
- checking if the determined action(s) is/are urgent—block 44 in FIG. 20;
- if the determined action(s) is/are urgent, performing said urgent action(s)—block 45 in FIG. 20;
- otherwise, i.e. if the determined action(s) is/are not urgent, planning the execution of said action(s) (which thus become preventive action(s))—block 46 in FIG. 20.

From the foregoing description, the innumerable innovative characteristics and technical advantages of the present invention are immediately obvious to an expert in the field.

In particular, it is important to stress that the present invention enables monitoring targets that (for example, due to physical or geometrical shape) are non-visible or non-always-visible or partially visible (with performance degradation) to remote sensing systems, through the combined use of one or more satellite SAR systems and/or SAR systems transported by aerial platforms and of purely passive electromagnetic mirrors that respond like point targets and are coupled in an integral manner with the objects that it is wished to monitor.

Furthermore, for monitoring, the present invention enables using both interferometric techniques (e.g., differential interferometry techniques) and non-interferometric techniques, as well as SAR sensors having different characteristics (e.g., different resolutions) and/or installed on board different platforms (e.g., several satellite platforms and/or several aerial platforms) and/or operating in different bands (e.g., in the X band, C band, L band, and/or other bands as well) and/or that acquire SAR images with different geometries.

The present invention enables monitoring critical infrastructures (e.g., power lines, bridges, dams, viaducts, oil pipelines, gas pipelines, aqueducts, etc.), buildings, reservoirs (e.g., natural and/or artificial reservoirs, channels, rivers, lakes, etc.) in a highly reliable manner, allowing any critical situations to be detected, with the same reliability and in a timely manner, and to consequently provide early warnings in the event of critical situations, so as to allow taking early action in order to avoid problems or even disasters (e.g., service interruptions (as in the case of power lines, oil pipelines, gas pipelines and aqueducts), collapses (as in the case of buildings, dams, bridges and viaducts), floods (as in the case of natural and artificial reservoirs, channels, rivers, lakes and dams, etc.).

With regard to currently known solutions, it is important to stress that Ref1 in no way provides for the combined use of intrinsically stable electromagnetic mirrors with imaging radars (i.e. SAR), but only contemplates the use of electromagnetic mirrors designed to provide an increase in the backscattered signal typically in a horizontal direction and at different angles. In fact, the main object of Ref1 is not that of monitoring objects via SAR images, but increasing the visibility of objects solely and exclusively for sighting radars to reduce the probability of collision at sea.

In other words, in Ref1 and in the known solutions similar to that according to Ref1, the passive electromagnetic mirrors are considered devices suitable only for increasing the radar cross-section of targets for sighting radars, without ever considering the specific requirements/characteristics of SAR systems.

More generally, until now the following characteristics of the present invention have never been postulated: the use of passive electromagnetic mirrors for movement measurements of targets based on SAR acquisitions, the directivity in predefined angular areas of the electromagnetic mirrors used, the stable and integral coupling of said electromagnetic mirrors with the targets to be monitored and the use of more electromagnetic mirrors for relative distance measurements.

Instead, with regard to Ref2 and, more generally, the use of active devices (i.e. transponders), it is important to draw attention to the fact that in order to use said devices for purposes of absolute and/or relative measurements between multiple elements, these devices must necessarily be calibrated in terms of group delay and, in any case, must have almost identical performance to one another that is stable over time. For this reason, they are used for calibration purposes. Conversely, the present invention enables monitoring non-visible or non-always-visible or partially visible objects by means of SAR remote sensing systems, purely passive electromagnetic mirrors and both interferometric and non-interferometric measurements. With regard to this, it is important to stress the point that the solution according to Ref2 makes exclusive use of active devices (with all the related limitations tied to the need of these devices for a power supply), while the present invention makes exclusive use of purely passive electromagnetic mirrors.

Furthermore, with regard to Ref3, this does not have the object of relative movement monitoring based on SAR images acquired with different geometries. In fact, the solution according to Ref3 is solely and exclusively limited to measurements based on interferometric SAR techniques. On the contrary, as already explained several times above, the present invention enables monitoring non-visible or non-always-visible or partially visible objects by means of SAR remote sensing systems, purely passive electromagnetic and both interferometric and non-interferometric measurements.

Finally, Ref4 describes a specific electromagnetic mirror that varies its radar cross-section as the level of water varies. This specific electromagnetic mirror does not possess the ability to concentrate energy in ideal points, but only to modulate it according to physical parameters (i.e. water height) and therefore, unlike that envisaged in the present invention, does not allow monitoring non-visible or non-always-visible or partially visible objects by means of SAR remote sensing systems, purely passive electromagnetic mirrors and both interferometric and non-interferometric measurements.

In other words, the present invention enables monitoring reservoirs via SAR systems by acting, unlike that described in Ref4, on the positions and/or phases of the targets and not on the backscattering brightness as taught by Ref4, in this way achieving much more accurate and reliable results.

In conclusion, it is clear that various modifications can be applied to the present invention without departing from the scope of the invention as defined in the appended claims.

The invention claimed is:

1. A monitoring method, comprising:
integrally coupling a first electromagnetic mirror of passive type and a given target to be monitored, wherein said given target is not visible, or not always visible, or partially visible to synthetic aperture radar;
integrally coupling a second electromagnetic mirror of passive type and the given target, or installing the second electromagnetic mirror of passive type in a given fixed position in a given area of the earth's surface where the given target is located; and
monitoring the given target by:
acquiring SAR images of the given area of the earth's surface by means of one or more synthetic aperture radar(s) installed on board one or more satellites and/or one or more aerial platforms,
computing, by means of a processing unit, distances between the first electromagnetic mirror and the second electromagnetic mirror in the acquired SAR images, and
determining, by means of the processing unit, a mutual displacement of the first and second electromagnetic mirrors on the basis of the distances between said first and second electromagnetic mirrors in the acquired SAR images;
wherein no interferometric technique is used.

2. The monitoring method of claim 1, wherein:
the given target is a power line;
the first electromagnetic mirror is integrally coupled with an overhead line of said power line; and
the second electromagnetic mirror is integrally coupled with a pylon of said power line or is installed in a given fixed position in the given area of the earth's surface where the overhead line of said power line is located.

3. The monitoring method of claim 1, wherein:
the given target is a building;
the first electromagnetic mirror is integrally coupled with a first part of said building; and
the second electromagnetic mirror is integrally coupled with a second part of the building, or is installed in a given fixed position in the given area of the earth's surface where said building is located.

4. The monitoring method of claim 1, wherein:
the given target is a bridge or a viaduct;
the first electromagnetic mirror is integrally coupled with a deck of said bridge or viaduct; and
the second electromagnetic mirror is integrally coupled in an integral manner with a pier of said bridge or viaduct, or is installed in a given fixed position in the given area of the earth's surface where said bridge or viaduct is located.

5. The monitoring method according to claim 1, wherein the given target is an infrastructure belonging to the set formed by dams, oil pipelines, gas pipelines and aqueducts.

6. The monitoring method of claim 1, wherein:
the given target is a reservoir;
the first electromagnetic mirror is installed so as to be integral with a water level in the reservoir; and
the second electromagnetic mirror is installed in a given fixed position in the given area of the earth's surface where said reservoir is located.

7. The monitoring method according to claim 6, wherein the reservoir is a natural or artificial reservoir, or a channel, or a river, or a lake.

8. A monitoring, critical situation detection and early warning method, comprising:
carrying out the monitoring method claimed in claim 1;
comparing the determined mutual displacement of the first and second electromagnetic mirrors with a predefined critical-situation-related threshold;
detecting a critical situation affecting the monitored given target if the determined mutual displacement of the first and second electromagnetic mirrors exceeds the predefined critical-situation-related threshold; and
if a critical situation affecting the monitored given target is detected, generating, via the processing unit, an early warning.

* * * * *